March 17, 1953

B. WELTE 2,631,501

BROACHING MACHINE

Filed Jan. 7, 1949

INVENTOR.
Benedict Welte.
BY
Harness, Dickey & Pierce
ATTORNEYS.

March 17, 1953　　　　B. WELTE　　　　2,631,501
BROACHING MACHINE
Filed Jan. 7, 1949　　　　　　　　　　　　　2 SHEETS—SHEET 2
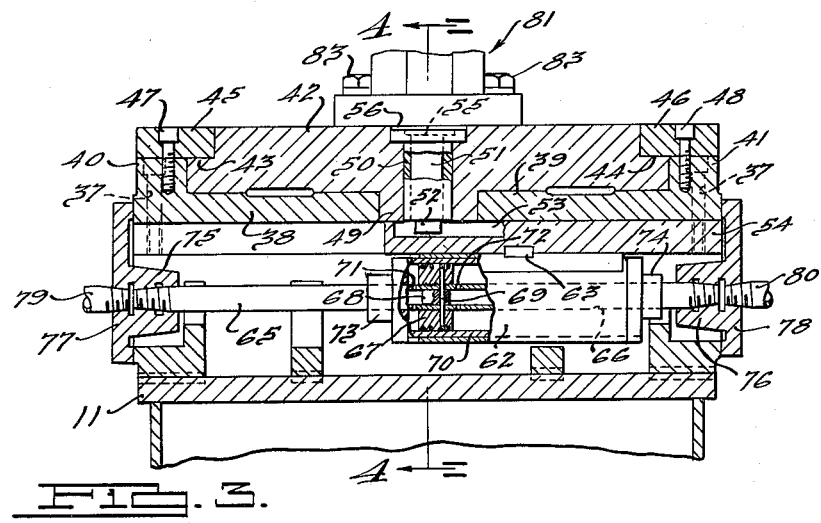
Fig. 3.
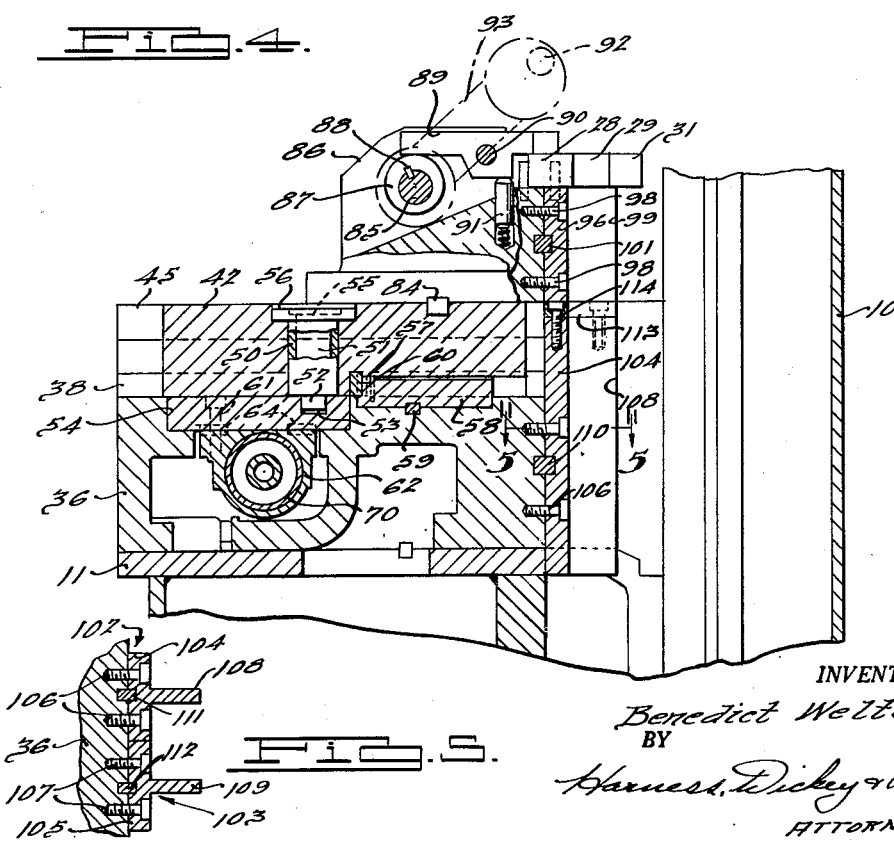
Fig. 4.
Fig. 5.
INVENTOR.
Benedict Welte.
BY
Harness, Dickey & Pierce
ATTORNEYS.

Patented Mar. 17, 1953

2,631,501

UNITED STATES PATENT OFFICE 2,631,501

BROACHING MACHINE

Benedict Welte, Lake Orion, Mich., assignor to Colonial Broach Company, Warren Township, Mich., a corporation of Delaware Application January 7, 1949, Serial No. 69,757

2 Claims. (Cl. 90—33)

This invention relates generally to broaching machines and more particularly to novel means for affording support to the overhanging portion or portions of a workpiece when the latter is mounted on a broaching machine and subjected to a broaching operation thereby.

While various attempts have been made heretofore to rigidly maintain a workpiece on a broaching machine during a broaching operation, it is well known that the portion of a workpiece to be engaged by and operated upon by the broaching tool must overhang the edge of its supporting bed or table in order that no obstruction will be present in the path of the tool travel. Since in some cases that part of the workpiece to be engaged by the tool overhangs the supporting table by a substantial amount, the action of the tool on the workpiece tends to somewhat distort the workpiece and thus introduce errors and chatter. By the present invention the provision of a novel means is contemplated by the use of which the foregoing drawback will be overcome.

An object of the present invention, therefore, is to provide a novel and improved broaching machine which may be of the single or dual ram type or any other type desired.

Another object of the invention is to provide a broaching machine with a novel and simple expedient which will provide an additional means of support for the overhanging portion of a workpiece during a broaching operation thereon, the support being of such nature as not to extend into the path of movement of the broaching tool or tools or to in any way interfere with the broaching operation.

A further object of the invention is to provide a broaching machine with novel means for supporting the overhanging portion of a workpiece to be subjected to a broaching operation, the configuration of the supporting means being adapted to assume any form depending upon the type of broaching tool utilized in the broaching operation so that while the workpiece is always supported at its overhanging portion, no obstruction will ever be present in the path of tool travel.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

In the drawings wherein like reference characters refer to like parts throughout the several views:

Figure 3 is a section view taken substantially along line 3—3 of Figure 2;

Figure 4 is a section view taken substantially along the line 4—4 of Figure 3; and Figure 5 is a section view taken substantially along line 5—5 of Figure 4.

Figures 1, 2:
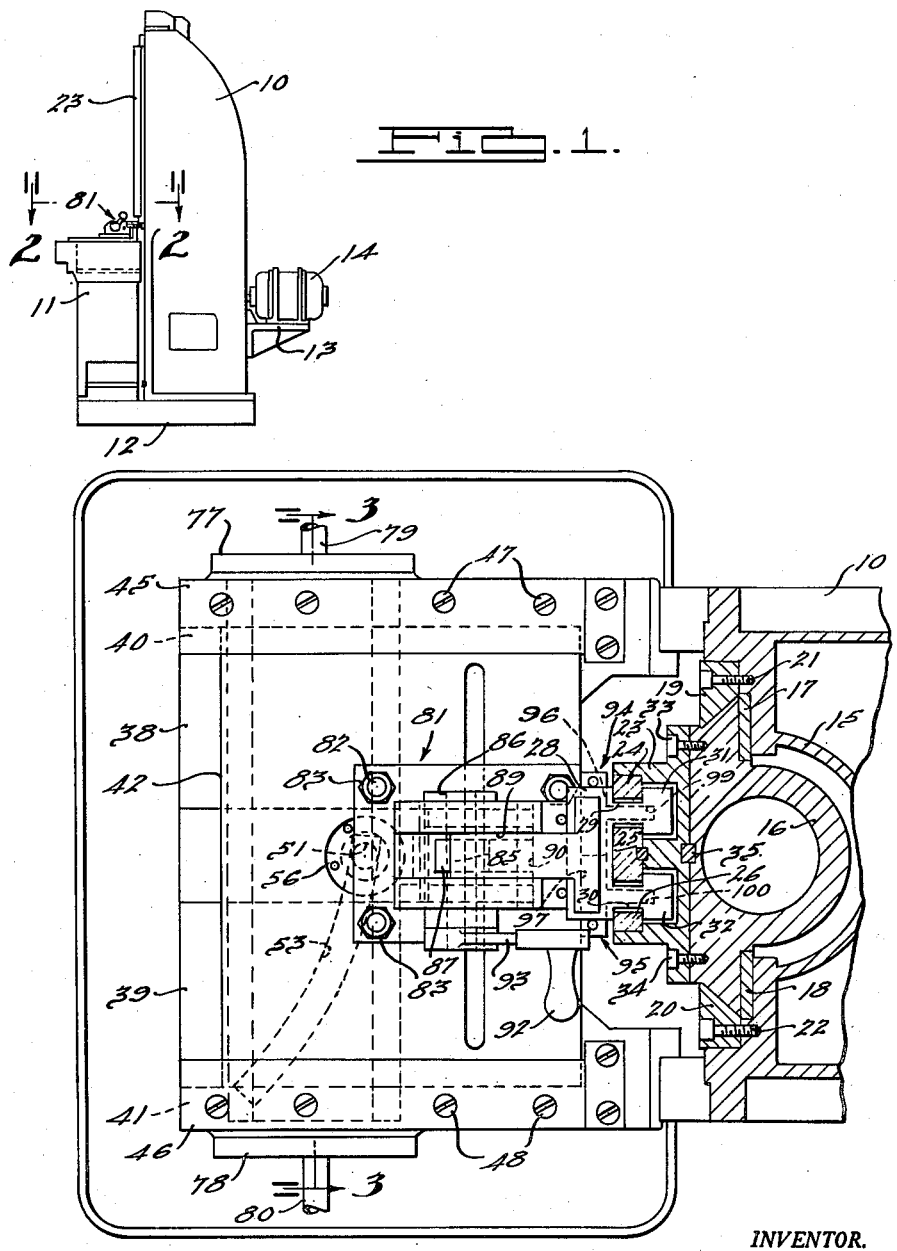
Figure 1 is a side elevation view of the novel and improved broaching machine embodying the invention hereof.
Figure 2 is an enlarged section view taken substantially along the line 2—2 of Figure 1.

Referring now to the drawings for a more detailed description of the novel and improved broaching machine of the present invention, the latter is shown in Figure 1 of the drawings as generally comprising a vertically extending frame or housing 10 and a forwardly extending table supporting portion 11 extending along one side of the housing, both of which are supported on a common base 12. A laterally extending bracket 13 which is attached to an opposite side of the housing, supports a motor 14 thereon which is adapted for driving a hydraulic pump (not shown) for supplying fluid under pressure for a purpose to presently appear.

The forward face of housing 10 is provided with a recess 15 (Figure 2) which slidably mounts a reciprocating hydraulic cylinder 16 therein, spaced bearing elements 17 and 18 being interposed between the side of the cylinder and the housing to thereby define ways for the cylinder during up and down movement of the latter relative to the housing. The cylinder is maintained in position to bear against the bearing elements 17 and 18 by way of retaining gibs 19 and 20 which are fastened to a wall of housing 10 by suitable screws 21 and 22.

The cylinder is hydraulically operated in a manner well known with the use of broaching machines and supports on its front flat face for motion therewith, a suitable broach holder 23 which may take any desired form but which, for a better understanding of the present invention and because of the type of workpiece to be broached, has been illustrated as having three spaced legs which extend toward the work and support broaches 24, 25 and 26. Broach 25 has teeth formed on opposite sides which face toward the teeth on broaches 24 and 26, thus forming a pair of slots. This specific arrangement of broaches is shown only because of the illustrated type of workpiece to be broached, the latter being shown as having a rectangular portion 28 and two spaced outwardly extending webs 29 and 30 which terminate in enlarged rectangular portions 31 and 32. The webs are adapted to extend through the slots and hence both sides of the webs are subjected to a broaching operation. Obviously the shape of the workpiece, as well as the particular type of broaching operation to be performed thereon, may vary, so that the broaching tool will correspondingly vary. The principal consideration remains that, since opposite sides of the webs 29 and 30 must be machined, a substantial overhang of the workpiece is unavoidable.

As shown more clearly in Figure 2 of the drawings, broach holder 23 may be secured directly to the flat face of cylinder 16 by way of screws 33 and 34 and maintained in trued position thereon by way of key 35 and suitable cross keys, not shown, or it may be supported on a tool holder (not shown) in which event the latter would be secured to the ram.

Attached to the top of table supporting portion 11, as better shown in Figure 4, is a base member 36 which has fastened thereto by way of screws 37 (Figure 3), two inwardly extending and spaced base plates 38 and 39 which at their outer ends have upstanding end portions 40 and 41 and which define a pair of ways for supporting and accommodating reciprocal motion thereon of a movable work supporting table 42. The table at both of its outer sides is provided with shouldered portions 43 and 44 which are engaged by overhanging retaining bars 45 and 46, the latter being fastened by suitable screws 47 and 48, to end portions 40 and 41 of the base plates, whereby the table is slidably confined on the ways defined by the base plates.

The underside of table 42, as better shown in Figure 3, is formed with an intermediate depending rib 49 which during sliding motion of the table on base plates 38 and 39 is confined for motion between the inner ends of the base plates. Provided at a central portion of the rib to extend through the table adjacent the forward end of the rib is an aperture which receives a hollow eccentric bushing 50 therein, the bushing in turn accommodating a lug or pin 51 whose lower end defines a driven member 52 extending below the rib to cooperate with an arcuate slot 53 of a cam member 54. Eccentric bushing 50 is utilized so that the initially desired position of pin 51 relative to the slot may be established. Once such adjustment has been achieved, the bushing may be secured to table 42 and a plug 55 may be used to maintain the pin within the bushing. Lastly, a wear plate 56 may be provided to conceal both the pin and bushing.

Base member 36 is channeled, as better shown in Figure 4, to accommodate sliding movement of the cam member 54 therein, such movement being transverse to the plane of movement of table 42. It will be apparent that with cam member 54 in its right-hand position, as viewed in Figure 3, table 42 will have been moved the maximum amount towards ram or cylinder 16 by virtue of the engagement between slot 53 and driven member 52, while if the cam member is moved to the left, table 42 will be moved away from the ram. A suitable arrangement is provided to limit inward motion of the table comprising an abutment 57 carried on the end of rib 49 (Figure 4) which is adapted for engagement with a cooperating abutment formed on a member 58 which is secured to the base member by way of a key 59. A felt wiper 60 may be carried by the upper portion of member 58 to thereby prevent the entry of foreign material to the ways on which the table moves.

Attached to the underside of cam member 54 by means such as screws 61 is a hydraulic cylinder 62 which is accurately aligned on the cam member by a longitudinally extending key 63, transversely arranged keys 64 being provided to take up the driving thrust. Cylinder 62 is arranged for reciprocal motion on a stationary hollow steel tube which forms a pair of hollow piston rods 65 and 66 extending from opposite axial ends of a solid piston 67 located within the cylinder. Communication between both piston rods is closed off by a dowel pin plug 68 which is pressed into the tube, as better shown in Figure 3, an external portion of the tube being preferably threaded to receive the threaded portion of the piston 67 thereon. With the piston securely mounted on the tube, the latter, as well as plug 68, is drilled radially through one of its rings to receive a dowel pin 69 whereby the plug is held against axial displacement with the piston by the pressures acting on its two opposed end faces.

Cylinder 62 is preferably provided with a lining 70 for accommodating sliding movement of the cylinder relative to the piston while piston rods 65 and 66 are provided with apertures or bores 71 and 72 respectively, closely adjacent the opposite end faces of piston 67 whereby the pressures within the hollow rods are communicated to their related piston faces. Stuffing boxes 73 and 74 are provided at opposite ends of cylinder 62 having suitable packing therein to prevent leakage of pressure fluids around piston rods 65 and 66, respectively.

The outer ends of both piston rods 65 and 66 are sealably mounted within inwardly extending bosses 75 and 76, respectively, of end plates 77 and 78, respectively, which are suitably fastened to base member 36. The outer end of piston rod 65 is tapered and provided with an external thread to threadably engage with boss 75 and is in communication with a pressure fluid conduit 79 likewise threadably engaged within boss 75. In a similar manner the outer end of piston rod 66 is tapered and provided with an external thread thereon to threadably engage with boss 76 and is in communication with a pressure fluid conduit 80 likewise threadably engaged with boss 76, it being understood that both bosses are provided with suitable packing material to provide leakproof fittings.

During operation of the machine suitable hydraulic control valves are operated to admit pressure to the cylinders 62 and 16 in sequence so that the table is first moved into broaching position; the cylinder 16 then moves downwardly to effect the broaching operation and bring the broach past the work, the table is then moved outwardly and finally the cylinder or ram 16 is returned to its uppermost or starting position. Since this mechanism may be conventional and forms no part of the present invention it is omitted from the drawings and need not be described.

A work-holding fixture, generally designated with the reference character 81, provided for securely holding the workpiece during the broaching operation, is secured to table 42 by way of bolts 83, a key 84 being further provided for taking up the shear stresses and for maintaining the fixture on the table. The fixture includes a shaft 85 whose outer ends are journaled for rotation within a pair of spaced end plates 86 carried by the fixture. A cam 87, secured to the shaft by way of a key 88, is adapted for engaging and rocking one end of a lever 89 which is pivotally mounted by way of a pin 90, likewise journaled in the end plates. The opposite end of the lever is enlarged and adapted to engage portion 28 of the workpiece to bear down on the latter and to hold it against a bearing block defined by a portion of the fixture. A spring-pressed plunger 91 is provided for normally urging lever 89 in a counter-clockwise direction, as viewed in Figure 4, to release the workpiece. By the operation of a handle 92 secured to a lever 93 which is fastened to shaft 85, the cam may be rotated in the desired direction to hold or release the workpiece.

As will be apparent from an inspection of Figure 4, some of portion 28 of the specific workpiece here illustrated, together with its webs 29 and 30, as well as rectangular end pieces 31 and 32 will extend beyond or overhang the supporting table 36. Since the work fixture must be constructed specially for the particular workpiece it must hold, it is possible to provide an overhang on the fixture to support the overhang of the workpiece. However, there is in the case of overhanging workpieces of the type illustrated inadequate support for the overhang of the fixture. Without anything more, the forces developed during the broaching operation when rectangular portions 31 and 32 are engaged by the broaching tool will tend to deflect the work and fixture and cause chatter. The novel invention hereof is provided so that the foregoing disadvantage is overcome and the workpiece is rigidly positioned during the broaching operation.

In the illustrated embodiment of the invention, T-shaped supporting elements 94 and 95 (Figure 2) are provided which include rectangular head portions 96 and 97, fastened by way of screws 98 to the inner flat end of fixture 81 and outwardly extending web or leg portions 99 and 100 which engage the bottom of webs 29 and 30 and a portion of the rectangular portions 31 and 32, the leg portions being somewhat narrower than the width of the webs so as not to obstruct movement of the broaching tool. Keys 101 may be provided to take up shearing stresses imposed on elements 94 and 95 during a broaching operation. These members therefore constitute the fixture overhang mentioned above. It will be appreciated, however, that the members 94 and 95 may form integral parts of the fixture itself.

Arranged to extend directly underneath elements 94 and 95 when table 42 is in its operating position for a broaching operation are a pair of T-shaped reinforcing elements 102 and 103 (Figure 5) each of which includes rectangular head portions 104 and 105 securely fastened to the inner flat face of base member 36 by way of screws 106 and 107, respectively, and outwardly extending web or leg portions 108 and 109 similar to legs 99 and 100 of elements 94 and 95. Keys 110 for taking up shear stresses may be provided together with truing keys 111 and 112. The upper portion of both elements 102 and 103 may be recessed somewhat to receive a wear plate 113 fastened to the elements by way of screws 114.

As the result of the above described construction, the heads 94 and 95 reciprocate with the table 42 and engage the underside of the workpiece beyond the inner edge of the table at all times. When the table moves into broaching position the heads 94 and 95 slide into a position in which they rest upon the wear plates carried by the reinforcing elements 102 and 103. Thus the overhanging portion of the workpiece is solidly supported by the table base during the broaching operation.

An important feature of the invention resides in the fact that the heads 102 and 103 may be readily removed and replaced by heads of different form to accommodate different workpieces without the necessity of making alterations in the machine itself.

Although but a single embodiment of the present invention has been illustrated and described in detail, it is to be expressly understood that the invention is not limited thereto. Various changes may be made in the design and arrangement of the parts without departing from the spirit and scope of the invention as will now be understood by those skilled in the art.

What is claimed is:

1. In a broaching machine of the type having a tool-carrying ram, a supporting base and a work-holding fixture movable on said base between an operative and a retracted position, the combination with said machine of a work support extending from said fixture toward the ram and adapted to support an overhanging portion of the work against the cutting forces of the tool, and reinforcing means for said work support, said reinforcing means being fastened to and extending from said base toward the ram, the work support and reinforcing means being in substantial contiguous alignment in the direction of tool travel when the fixture is in its said operative position, said work support and reinforcing means extending toward the ram beyond the outermost portions of the tool teeth.

2. In a broaching machine of the type having a tool-carrying ram, a supporting base, a table movable on said base between an operative and a retracted position, and a work-holding fixture mounted on said table for movement therewith, the combination with said machine of a work support extending from said fixture toward the ram and adapted to support an overhanging portion of the work against the cutting forces of the tool, and reinforcing means for said work support, said reinforcing means being of elongated shape and fastened to said base, one end of said reinforcing means being adapted to engage said work support when the table and fixture are moved into operative position, said work support and reinforcing means being in substantial contiguous alignment in the direction of tool travel when the fixture is in its said operative position, said work support and reinforcing means extending toward the ram beyond the outermost portions of the tool teeth.

BENEDICT WELTE.

REFERENCES CITED

The following references are of record in the file of this patent:

UNITED STATES PATENTS

| Number | Name | Date |
| --- | --- | --- |
| 2,065,219 | Ferris | Dec. 22, 1936 |
| 2,084,061 | Morton | June 13, 1937 |
| 2,274,226 | Weidemann | Feb. 24, 1942 |
| 2,323,463 | Ferris | July 6, 1943 |
| 2,372,825 | Grad | Apr. 3, 1945 |
| 2,459,697 | Halborg | Jan. 18, 1949 |